United States Patent [19]
Itoh et al.

[11] Patent Number: 5,223,957
[45] Date of Patent: Jun. 29, 1993

[54] OPTICAL SCANNING DEVICE

[75] Inventors: Tatsuo Itoh; Shinichi Mizuguchi, both of Osaka, Japan

[73] Assignee: Matsushita Electric Industrial Co., Ltd., Kadoma, Japan

[21] Appl. No.: 881,638

[22] Filed: May 12, 1992

Related U.S. Application Data

[63] Continuation of Ser. No. 579,326, Sep. 10, 1990, abandoned.

[30] Foreign Application Priority Data

Sep. 14, 1989 [JP] Japan .................. 1-238546

[51] Int. Cl.⁵ .................. G02B 5/32; G02B 26/10
[52] U.S. Cl. .................. 359/17; 359/18; 359/220
[58] Field of Search .................. 350/3.7, 3.71, 6.7, 350/6.9, 6.91, 162.23, 443; 359/17, 18, 572, 15, 19, 212, 216, 220

[56] References Cited

U.S. PATENT DOCUMENTS

| | | | |
|---|---|---|---|
| 3,614,193 | 10/1971 | Beiser | 350/3.71 |
| 3,721,487 | 3/1973 | Pieuchard et al. | 350/3.71 |
| 3,953,105 | 4/1976 | Im | 350/3.71 |
| 4,239,326 | 12/1980 | Kramer | 359/18 |
| 4,304,459 | 12/1981 | Kramer | 350/3.71 |
| 4,436,398 | 3/1984 | Endo et al. | 359/572 |
| 4,531,809 | 7/1985 | Carter et al. | 359/572 |
| 4,591,256 | 5/1986 | Matsumura | 350/162.23 |
| 4,826,270 | 5/1989 | Opheij et al. | 350/3.7 |
| 4,870,274 | 9/1989 | Herbert et al. | 350/6.9 |
| 5,074,646 | 12/1991 | Huang et al. | 359/572 |

OTHER PUBLICATIONS

Dickson et al., "Holographic Disc.," *IBM Technical Disclosure Bulletin*, vol. 27, No. 2, Jul. 1984, p. 959.
Hasegawa et al., "Compact Holographic Disk in All Holographic Line Scanner for Diode Laser Printers", SPIE vol. 1052, pp. 158–162.

*Primary Examiner*—Martin Lerner
*Attorney, Agent, or Firm*—Wenderoth, Lind & Ponack

[57] ABSTRACT

An optical scanning device which includes a laser light source, an aspheric lens for converging a laser beam emitted from the laser light source, and a reflection type holographic disk for diffracting and scanning the laser beam passing through the aspheric lens.

1 Claim, 3 Drawing Sheets

OPTICAL SCANNING DEVICE

This application is a Rule 1.62 continuation of now abandoned application Ser. No. 07/579,326, filed Sep. 10, 1990 now abaondoned.

BACKGROUND OF THE INVENTION

The present invention generally relates to a scanner, and more particularly, to an optical scanning device to be used, for example, in a laser printer, bar code scanner or the like.

In recent years, as office automation appliances, etc. have come to be widely used, attention has been directed to a laser printer with a high accuracy and a low noise as one type of output device thereof. Although such a laser printer currently in use employs a polygonal mirror scanner as an optical scanning device in many cases, development of holographic scanners which can be readily produced on a large scale has also been under way for achieving reduction in cost, as disclosed in detail, for example, in Japanese Patent Laid-Open Publications Tokkaisho Nos. 62-28708, and 62-234117, etc.

One example of the conventional optical scanner employing the holographic scanner as referred to above will be explained hereinafter with reference to FIG. 5 showing general construction thereof.

In FIG. 5, the known optical scanning device P includes a semi-conductor laser unit 1, a holographic lens 2, a holographic disk 3, and a motor 4 attached to the holographic disk 3.

In the above arrangement, laser light emitted from the semi-conductor laser unit 1 is formed into a converged laser beam 5. On the holographic disk 3 disposed on an optical path of the converged laser beam 5, a plurality of transmission type holograms (not particularly shown) are provided in an annular shape, and by the lens action of such transmission type holograms, the converged laser beam 5 is focused at a focal point of said transmission type hologram. Since focal point of the transmission type holograms vary varies through rotation of the motor 4 associated therewith, the converged laser beam 5 must be subjected to scanning on a photoreceptor drum 6.

The known arrangement as described so far, however, has a problem that, since the transmission type hologram employed therein is formed by laser interference exposure, with a resist sensitive to the laser beam being applied on a surface of a transparent substrate, the resist forming the interference pattern tends to be swollen by absorbing moisture from the air so as to produce turbulence in the pattern, thus resulting in undesirable variation in the scanning characteristics.

Another disadvantage is such that, the hologram generally has a low diffraction efficiency, and as compared with the transmission efficiency of normal lenses, it has very poor efficiency for utilizing light. Moreover, in the arrangement as described above, there has also been a problem that, since two sheets of holograms, i.e. the hologram lens and the hologram disk are employed, the light utilizing efficiency is still further lowered.

SUMMARY OF THE INVENTION

Accordingly, an essential object of the present invention is to provide an optical scanning device, which has a superior resistance to environmental conditions, and has a high light utilizing efficiency.

Another object of the present invention is to provide an optical scanning device of the above described type, which is simple in construction and stable in functioning and has high reliability, and can be readily manufactured on a large scale at low cost.

In accomplishing those and other objects, according to a first embodiment of the present invention, there is provided an optical scanning device which includes a laser light source, an aspheric lens for converging a laser beam emitted form said laser light source, and a reflection type holographic disk for diffracting and scanning the laser beam passing through the aspheric lens.

According to a second embodiment of the present invention, there is also provided an optical scanning device which includes a laser light source, and a reflection type holographic disk for diffracting and scanning a laser beam emitted from the laser light source, wherein said reflection type holographic disk has on the surface other than the side on which an interference pattern is formed, a non-planar configuration.

In the first embodiment of the present invention as described above, the laser light emitted from the laser light source is converged by the aspheric lens so as to be diffracted and scanned by the reflection type hologram disposed on the optical path of the converged light. Thus, the utilization efficiency of light is improved by employing the aspheric lens having a high light transmitting efficiency, while through use of the reflection type hologram in which the reflection film is formed on the surface of the transmission type hologram, direct contact of the resist with air is advantageously prevented which improves resistance to environmental conditions.

In the second embodiment of the present invention, by forming the face of the reflection type hologram upon which light is incident, into non-planar configuration, the laser light is converted into the converged beam as it advances and returns through the holographic substrate, while it is also diffracted and scanned by the reflection type hologram.

BRIEF DESCRIPTION OF THE DRAWINGS

These and other objects and features o the present invention will become apparent from the following description of the preferred embodiment thereof with reference to the accompanying drawings, in which.

DETAILED DESCRIPTION OF THE INVENTION

Figure 1:
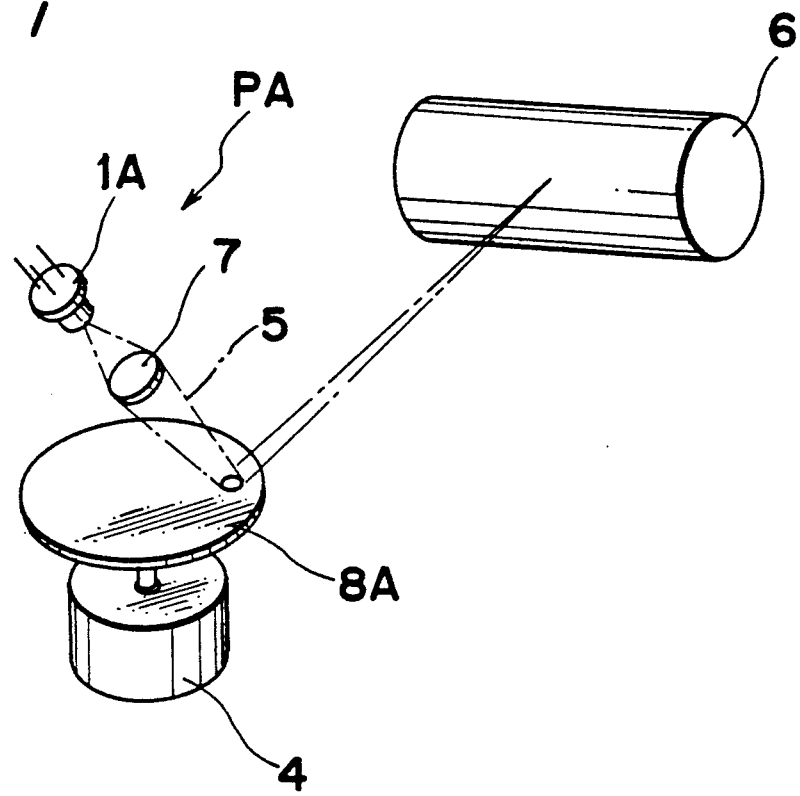
FIG. 1 is a schematic diagram showing the general construction of an optical scanning device according to a first embodiment of the present invention.

Before the description of the present invention proceeds, it is to be noted that like parts are designated by like reference numerals throughout the accompanying drawings.

Figure 5:
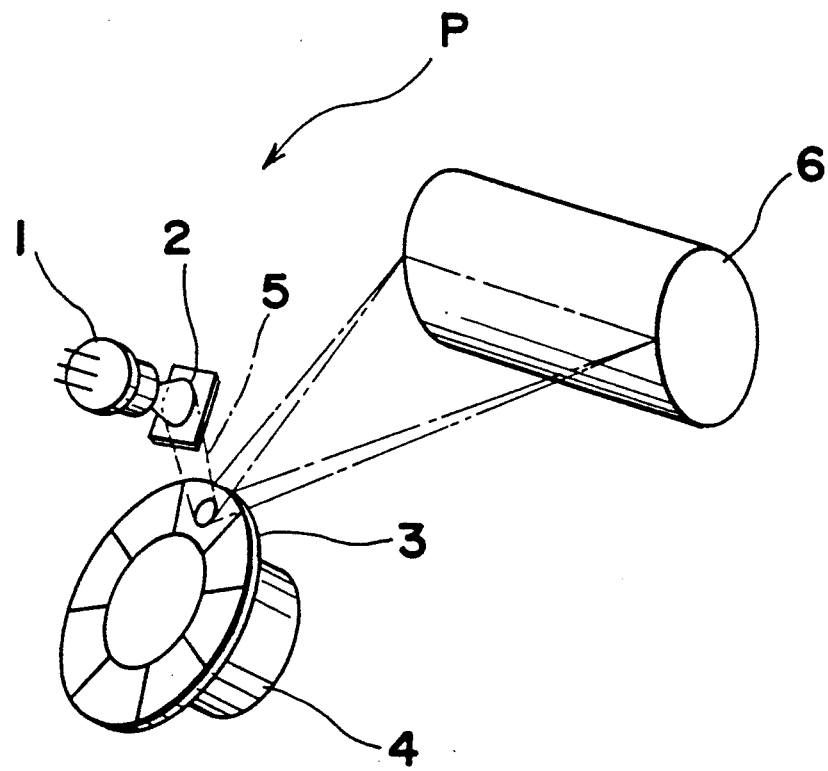
FIG. 5 is a schematic diagram showing the general construction of a conventional optical scanning devic (already referred to).

Referring now to the drawings, there is shown in FIG. 1, an optical scanning device PA according to one preferred embodiment of the present invention, in which like parts to those in the conventional optical scanning device P referred to earlier with reference to FIG. 5 are designated by like reference numerals for brevity of explanation.

In FIG. 1, the optical scanning device PA of the present invention generally includes a semi-conductor laser unit 1A as a laser light source, an aspheric lens 7 having a similar converging function to that of the holographic lens 2 referred to in FIG. 5, and a reflection type holographic disk 8A coupled with a motor 4 for rotation thereby.

Figure 2:
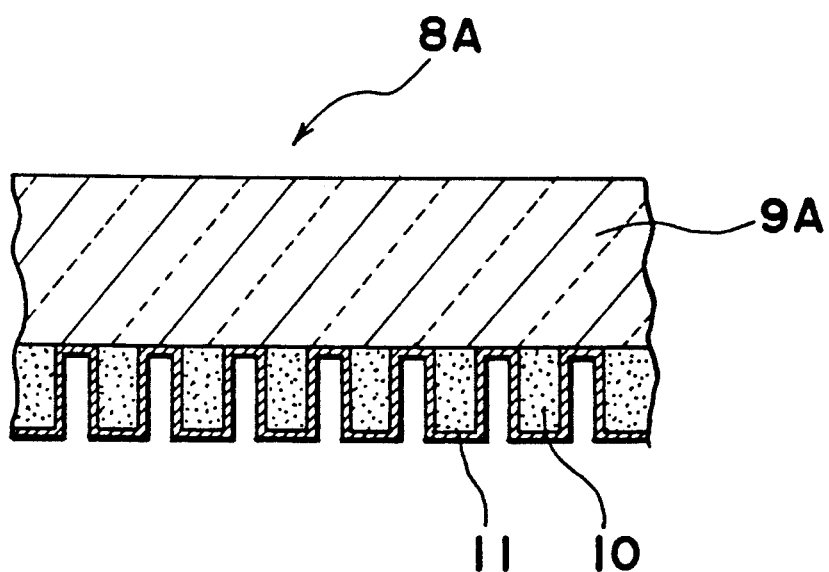
FIG. 2 is a fragmentary cross section of a reflection type holographic disk employed in the optical scanning device of FIG. 1.

As shown in the cross sectional diagram of FIG. 2, the reflection type holographic disk 8A is composed of a substrate 9A made of a laser light transmitting glass, resin oz the like, a resist interference pattern 10 formed over one surface thereof, and a reflection film 11 of a metallic coating such as aluminum, silver or gold, etc., formed over the surface of the resist interference pattern 10.

In the above arrangement of FIGS. 1 and 2, the laser light emitted from the semi-conductor laser unit 1A is converged by the aspheric lens 7 into a laser beam 5, and is further subjected to diffraction and reflection by the reflection type holographic disk 8A having the cross section as shown in FIG. 2, with the pitch or distance between neighboring recesses in the resist interference pattern 10 being continuously varied in the circumferential direction of the disk 8A. Accordingly, upon rotation of the reflection type holographic disk 8A by the motor 4, the pitch of the recesses in the resist interference pattern 10 at the incident position of the converged laser beam 5 is thus continuously varied, with simultaneous continuous variation also of the diffracting angle for scanning of the laser beam 5 on the photoreceptor drum 6. In the above case, since the resist interference pattern 10 is cut off from the surrounding air layer by the reflection film 11 as shown in FIG. 2, any adverse effect due to wetting and swelling by the absorption of moisture, etc. can be advantageously reduced.

Figure 3:
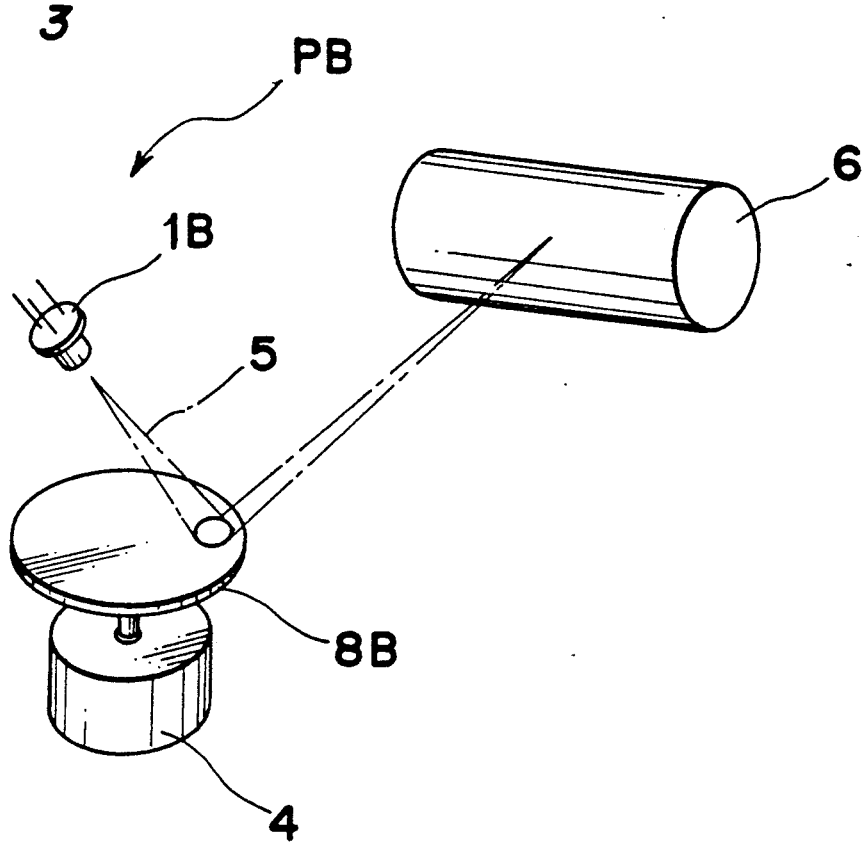
FIG. 3 is a schematic diagram showing the general construction of an optical scanning device according to a second embodiment of the present invention.
Figure 4:
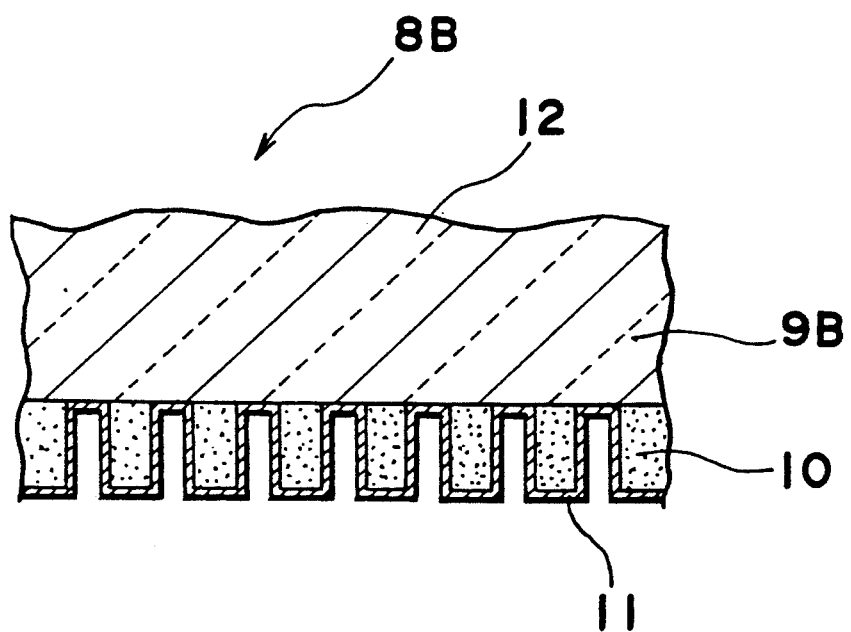
FIG. 4 is a fragmentary cross section of a reflection type holographic disk employed in the optical scanning device of FIG. 3.

Referring further to FIGS. 3 and 4, there is shown another optical scanning device PB according to a second embodiment of the present invention.

In the arrangement of FIG. 3, the aspheric lens 7 described as employed in the optical scanning device PA of FIG. 1 is dispensed with, while the substrate 9A of the holographic disk 8A referred to in FIG. 2 is replaced by substrate 9B having the surface 12 on the side other than that which has the interference pattern 10 formed into a non-planar shape as shown in the reflection type holographic disk 8B shown in FIG. 4, whereby through utilization of diffraction at the surface 12 of the substrate 9B, converging waves are produced to provide a similar effect as in the first embodiment of FIG. 1, with less number of parts required.

Since other constructions and functions of the optical scanning device PB of FIGS. 3 and 4 are generally the same as those in the optical scanning device PA of FIGS. 1 and 2 for the first embodiment, a detailed description thereof is omitted here for brevity of explanation, with like parts being designated by like reference numerals.

It should be noted here that, in the foregoing embodiments, although the reflection film is formed on the reflection type holographic disk, the resistance to environmental conditions may of course be further improved, if a protective film is further formed over the reflection film. In the second embodiment, the aspheric lens is dispensed with, but an optical system with a still less aberration may also be achieved, if an aspheric lens and a non-planar substrate are simultaneously used.

As is clear from the foregoing description, according to the first embodiment of the present invention, the resistance to environmental conditions can be improved through employment of the reflection type hologram, while by the adoption of the aspheric lens, the light utilizing efficiency in total upon combination with the holographic disk can also be improved.

According to the second embodiment of the present invention, by using the non-planar holographic disk instead of the aspheric lens, the number of parts can be reduced, with consequent reduction of cost, and labor required for the positional alignment between various parts.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:
1. An optical scanning device, comprising:
a laser light source for producing a laser light beam;
a reflection type holographic disk rotatably mounted for rotating said disk through the path of the laser light beam from said light source and for diffracting and scanning the laser beam, said reflection type holographic disk being a layer of a moisture impervious transparent material having a front surface on one side thereof and a back surface on the other side and an interference pattern on said back surface with an inner surface against said back surface and a reflection film on an outer surface of said interference pattern the front surface of said disk being uncoated and having a non-flat surface shaped for converging the laser light beam onto said one surface, said other surface positioned for receiving the laser beam directed onto said disk for permitting the laser beam to pass through said disk and be incident on the inner surface of said interference pattern.

* * * * *